United States Patent [19]
Jamrog

[11] Patent Number: 5,861,958
[45] Date of Patent: Jan. 19, 1999

[54] MULTIPLE-FILE FEATURE FOR A FAX PRINTER DRIVER

[75] Inventor: Daniel M. Jamrog, Acton, Mass.

[73] Assignee: Biscom Incorporated, Chelmsford, Mass.

[21] Appl. No.: 792,555

[22] Filed: Jan. 31, 1997

[51] Int. Cl.⁶ ...................................................... H04N 1/00
[52] U.S. Cl. ........................ 358/403; 358/435; 358/438; 379/100.13
[58] Field of Search .................................. 358/400, 403, 358/404, 444, 435, 436, 438, 439; 379/201, 100.01, 100.06, 100.12, 100.13

[56] References Cited

U.S. PATENT DOCUMENTS

| 5,533,110 | 7/1996 | Pinard | 379/201 |
| 5,552,881 | 9/1996 | Jezwinski | 356/73.1 |
| 5,631,954 | 5/1997 | Evans | 379/201 |

OTHER PUBLICATIONS

Postscript fax; Adobe Sys. pp. 1–9 (1993).
Delrina WinFax Pro 4.0 Users Guide, pp.3–24 to 3–27, 6–3 to 6–11, 14–10, First Ed., Mar. 1994.

*Primary Examiner*—Scott Rogers
*Assistant Examiner*—Jerome Grant, II

*Attorney, Agent, or Firm*—Banner & Witcoff Ltd.

[57] ABSTRACT

A multiple-file facsimile feature for a fax printer driver allows combination of multiple files into a single facsimile transmission via the computer application programs in which the files were created, without the need to later identify and select the files a second time in order to create the multiple-file fax. The feature is advantageously implemented on a LAN-based computer, such as by a C-language program. When fax transmission of a file is requested, a dialog box containing dedicated buttons for the various functions involved in multiple-file fax creation is displayed by the fax printer driver, with a list containing the names of the files that have been added to the multiple-file fax displayed in a subwindow. The Add-to-List function converts each selected file to a faxable file that is saved in the temporary directory, adds the file name to the multiple-file fax list, and transfers the user back to the calling application program. This function is repeated until all desired files have been added to the multiple-file fax list. The Send function creates an envelope for the files, sends the files in the envelope to the fax modem or apparatus interface, performs a file clean-up function, and then transfers the user back to the application program. A Cancel function allows either the current print to be canceled or the composition of the current multiple-file fax to be canceled. A Remove function allows files to be removed from the fax list either temporarily, in order that another fax may be sent, or permanently from the compound fax currently being composed.

24 Claims, 4 Drawing Sheets

MULTIPLE-FILE FEATURE FOR A FAX PRINTER DRIVER

FIELD OF THE INVENTION

This invention relates to electronic communications devices, and more particularly to facsimile transmission of multiple computer files.

BACKGROUND

Facsimile (FAX or fax) transmission has become an increasingly popular and important communication method. While conventional fax transmission uses paper documents as the input to a specialized fax machine, direct facsimile transmission of electronic documents via a desktop-type computer is becoming very common. This has particularly occurred because direct fax transmission of electronic documents eliminates several steps, and hence several opportunities for the introduction of errors, in the transmission process. If desired, documents created on a computer can now, through electronic fax transmission, be transmitted, received, and reviewed without generation of paper copies of the documents.

Fax transmission software for electronic documents may be "personal," installed directly on a personal computer attached to a fax modem or apparatus, or may be accessible by several users via a Local Area Network (LAN) while actually being physically installed on a central server that is coupled to the fax modem or apparatus. In either environment, the fax transmission software must interact with both a computer operating system and the fax modem or apparatus, as well as be accessible to the user in a convenient and simple manner. To that end, it is particularly valuable if the fax transmission software can interact with, and be accessed through, the various document-generating application programs being employed by the user, such as, for example, word processing software, graphics generation systems, and spreadsheet applications.

Utilizing present fax transmission software, a user can generally fax a file created by a computer application program by "printing" it using a fax printer driver. The file is then faxed at the conclusion of the print process. Because the file is always faxed immediately, it is not possible to combine multiple files, particularly files created by different application programs, and have them transmitted in a single, compound fax. One solution utilized for this problem has been to have the application files automatically translated to image format, either at the user workstation or as a back-end server process. The translated files can then be combined manually into a single file for fax transmission. This solution has several major limitations, however, among them being the facts that not all application files can be successfully translated into image format, that the translation process tends generally to be very slow, and that the manual combination of files is time- and effort-consuming for the user, as well as being error-prone.

One alternate solution is to treat multiple files as multiple attachments to a single fax, with all files being sent in a single transmission at the final iteration of the attachment process. This type of feature is found in at least one personal fax product, Delrina WinFax Pro 4.0. When using the WinFax Pro product to create a multiple-file fax, it is generally necessary that the files intended for the fax transmission first be saved from the individual application programs into an attachment folder. [See *Delrina Win Fax Pro 4.0 User's Guide*, March 1994, p. 3–27]. The files to be combined into the single facsimile transmission must then be manually "selected" a second time, this time from the attachment folder, in order to create an attachment list that is subsequently used by the fax driver to build the multiple-file fax. Files saved into the attachment folder remain saved and listed there until, and unless, they are manually removed. This means that this second, manual selection of the specific files to be sent in a particular fax must be made each and every time a compound fax is created.

Although retention of files on the attachment list can have certain useful applications, for example when the same file must be used in building a number of different fax transmissions, there are also several aspects of the procedure that may constitute a drawback to the user. Users may find it inconvenient to have to select all the files intended for the multiple-file fax a second time when they have already selected them via the application program. In addition, because the user must select the files a second time, there is a significant likelihood of either a file being omitted from the fax or an extra, undesired file being added to the fax, as well as a chance that the files will be combined into the fax transmission in an order different from the order desired by the user. The latter could cause considerable confusion, for example, in a situation where a text document or spreadsheet is stored electronically in several different files and those files are then combined in an incorrect order into the fax transmission.

A further complication is created by the fact that many computers allow files to have names consisting of only a very limited total number of characters, e.g. 8 characters before a period followed by only 3 more characters. This means that computer file names are often not particularly descriptive, and users frequently find themselves running the application in which a file was created in order to determine the file's contents. The products for creating multiple-file faxes that currently exist essentially require that the user remember the name of each file that is targeted for the compound fax, as this is the only way that the file can later be selected a second time to actually create the fax. Particularly if some files have not been stored in image format, the user may even have to resort to running the application program a second time merely to identify the files contained in the attachment folder in order that the correct ones can be combined into the fax.

The WinFax Pro product has, in fact, recognized this persistent problem by requiring that the user interact with an extra dialog box each time that a file is selected for faxing through an application program. This dialog box gives the user an opportunity to rename the file and to include descriptive information about its contents, so that the file can later be identified during the second selection process that is required in order to actually create and send the multiple-file fax. While solving the initial problem, this method creates extra work for the user, particularly in comparison to, for example, creating and sending the multiple-file fax directly from the various application programs in which the file contents can be simultaneously viewed. What has been needed, therefore, is a way to create and send a multiple-file fax directly from one or more application programs, without the need for either a second selection process or special file identification procedures.

OBJECTS OF THE INVENTION

Accordingly, a primary object of the present invention is to provide an easy-to-use way to create a facsimile transmission from multiple electronic files.

In particular, an object of the present invention is to provide a process for the creation of a multiple-file facsimile transmission that requires that each file from which the fax is built be identified and selected only once.

A further particular object of this invention is to allow the convenient creation of multiple-file facsimile transmissions via a local area network fax server.

An additional particular object of the invention is to minimize the potential for user-generated errors in the multiple-file facsimile creation process.

SUMMARY

The present invention allows a user to combine multiple files into a single facsimile transmission while still remaining in the application program or programs in which the files were originally created, without the need for the user to print each file to a faxable file and specify a filename by which each file can be later identified and re-selected to be part of the multiple-file fax. In a preferred embodiment, the multiple-file fax feature of the present invention is advantageously implemented on a LAN-based server.

In the preferred embodiment, the invention is implemented by means of a computer containing programs and data structures suitable for providing the desired control functions, such as through a C-language program. In one embodiment, a dialog box containing a dedicated "Add-to-List" button for multiple-file fax creation, as well as dedicated "Send", "Cancel", and "Remove" buttons, is displayed by the fax printer driver when the user requests fax transmission of a file.

In a preferred embodiment, the multiple-file fax feature of the invention is initialized at the invocation of the fax printer driver by the user printing a file to the fax printer as the target printer from an application program. A multiple-file fax list, previously stored in memory, contains the names of the files, if any, that have been previously added to the multiple-file fax and is displayed along with the current file name in a subwindow of the dialog box presented to the user by the fax printer driver. Four main instruction inputs are accepted from the user: Send, Add-to-List, Cancel, and Remove. If Add-to-List is requested, the file is converted to a faxable file that is saved in a temporary multiple-file fax directory, the file name is added to the multiple-file fax list, and the user is transferred back to the calling application program. This procedure is repeated until all desired files have been added to the multiple-file fax list.

If a Send is requested, in one embodiment the current file is printed in a faxable format to a temporary file and saved in the temporary multiple-file fax directory. An envelope is created for the multiple files, the envelope is sent with the files to the fax modem or apparatus interface, and a file clean-up function is performed, including deletion of the file names from the multiple-file fax list and deleting the files stored in the temporary directory. The user is then transferred back to the calling application program.

If Cancel is requested, the system of this embodiment requests further input from the user as to whether the current print operation or the composition of the current multiple-file fax is being canceled. If the current print is being canceled, the ongoing print process is halted, any temporary file already created is deleted, and the user is transferred back to the calling application program. If the composition of the current multiple-file fax is being canceled, the clean-up function is performed, the print of the current file is canceled, and the user is transferred back to the calling application program.

If Remove is requested, the system of this embodiment requests further input from the user as to whether the files are to be removed temporarily from the fax list, so that a regular fax may be sent, or whether they are to be removed permanently from the compound fax currently being composed. The user selects the specific files to be removed. If the removal is temporary, the selected file names are removed from the immediate send list and a fax may then be sent composed of the current file and any remaining files on the list. The system then awaits further input from the user, allowing the user to choose to add the current file to the list, send the modified fax, remove additional files, or cancel the print of the current file or composition of the multiple-file fax and return to the calling application program. If the removal is permanent, the clean-up function is performed on just the selected files and further input from the user is again awaited.

DETAILED DESCRIPTION OF THE PREFERRED EMBODIMENT

The present invention allows a user to combine multiple files into a single facsimile transmission while still remaining in the application program or programs by which the files were originally created. This is accomplished without the need for the user to print each file to an image file and then specify a new filename by which each file can be later identified and re-selected to be part of the multiple-file fax. In a preferred embodiment, the invention is implemented by means of a computer containing programs and data structures suitable for providing the desired control functions, as seen in the block diagram shown in FIG. 1.

Figure 1:
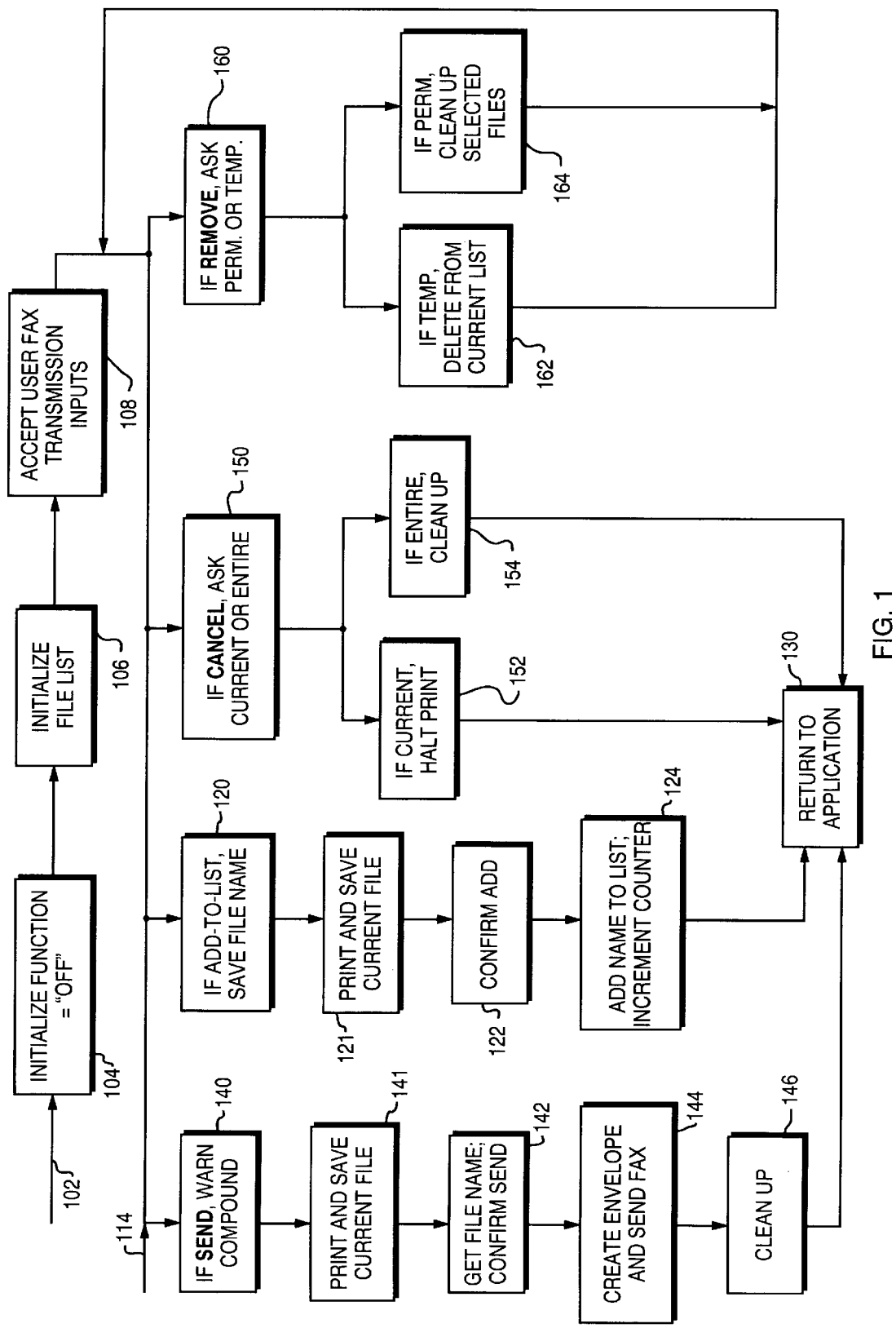
FIG. 1 is a block diagram of one implementation of the multiple-file facsimile feature of the present invention.

The multiple-file fax feature of the invention, as implemented in the embodiment of FIG. 1, is initialized at the invocation of the fax printer driver 102, which occurs when the user prints a file to the fax printer as the target printer from an application program. During the initialization process, the multiple-file fax value is initially set to "off" for the current file. A multiple-file fax list, previously stored in memory, containing the names of the files, if any, that have been previously added to the multiple-file fax currently being composed, if any, is fetched 106 from memory. The current file name is then displayed, along with the file names from the multiple-file fax list in a list, in a subwindow of the dialog box presented to the user by the fax printer driver. The system, through the dialog box, then allows the user to control the composition, direction, and transmission of the fax, accepting 108 such inputs as a "Send to" address, a return address, and cover page notes.

In this embodiment, the system next waits for further instruction from the user 114. Four main instruction inputs are accepted by the multiple-file fax feature: Send 140, Add-to-List 120, Cancel 150, and Remove 160. If the Add-to-List input 120 is received, the name of the file that will be created by the printing of the current file is saved in a global variable and the file is then printed 121 to that file, which is then saved in the temporary multiple-file fax directory. In the preferred embodiment, this file will be an image file. After confirming that an addition to the compound fax currently being composed has been requested 122, the file is added to the multiple-file fax list 124 by saving the file name from the global variable to the appropriate place in memory, while a counter set up to keep track of the number of files on the list is incremented by one. Active operation of the feature then terminates 130 by closing the dialog box and transferring the user back to the calling application program.

If the Send input 140 is received, in the preferred embodiment of FIG. 1 the system warns the user that any fax sent will be a compound fax containing all the files on the list. The current file is printed to a temporary file and saved in the temporary multiple-file fax directory 141. After obtaining confirmation that a compound fax send is requested 142, the system creates an "envelope" for the compound fax files and then sends the envelope with the files to the fax modem or apparatus interface. This operation is well know in the art, being the same procedure used to send a fax with attachments generated in any of the manners well-known in the art.

Once the compound fax has been sent off to the fax interface, a clean-up function 146 is performed. In the preferred embodiment, this includes deleting the file names from the multiple-file fax list stored in memory, setting the list counter equal to zero, and deleting all the files stored in the temporary directory. Active operation of the feature then terminates 130 by closing the dialog box and transferring the user back to the calling application program.

If the Cancel input 150 is received, the system of this embodiment requests further input from the user as to whether it is the current print operation or the composition of the current multiple-file fax which is being canceled. If the input received is that the current print is being canceled, the system halts 152 the ongoing print process and deletes any temporary file already created and saved during the print. Active operation of the feature is then terminated 130 with the closing of the dialog box and transferring of the user back to the calling application program.

If the input received is that the composition of the current multiple-file fax is being canceled, a clean-up function is performed 154. This includes deleting all the file names from the multiple-file fax list stored in memory, setting the list counter equal to zero, and deleting all the files stored in the temporary directory. The print of the current file is also halted, and any associated file in the temporary directory is deleted. Active operation of the feature then terminates 130 with the closing of the dialog box and transferring of the user back to the calling application program.

If the Remove input 160 is received, the system of this embodiment requests further input from the user as to whether the files are to be removed temporarily from the fax list, in order that a regular fax may be sent, or are to be removed permanently from the compound fax currently being composed. Input is also received in the form of user selection, via the list in the dialog box, of the specific files to be removed. If the input received is that the removal is temporary, the selected file names are removed from the immediate send list and a fax may then be sent that is composed of only the current file and any remaining files on the list. The system awaits further input from the user 114, rather than returning directly to the calling application program. This allows the user to now choose to add 120 the current file to the list, send 140 the modified multiple-file fax, remove 160 additional files, or cancel 150 the print of the current file and return 130 to the calling application program.

If the input received is that the removal is permanent, a clean-up function is performed 164 on just the selected files. This includes deleting the selected file names from the multiple-file fax list stored in memory, decrementing the list counter accordingly, and deleting the associated files stored in the temporary directory. As before, the system then awaits further input from the user 114, allowing the user to choose to add 120 the current file to the list, send 140 the modified multiple-file fax, remove 160 additional files, or cancel 150 the print of the current file and return 130 to the calling application program.

Figure 2A:
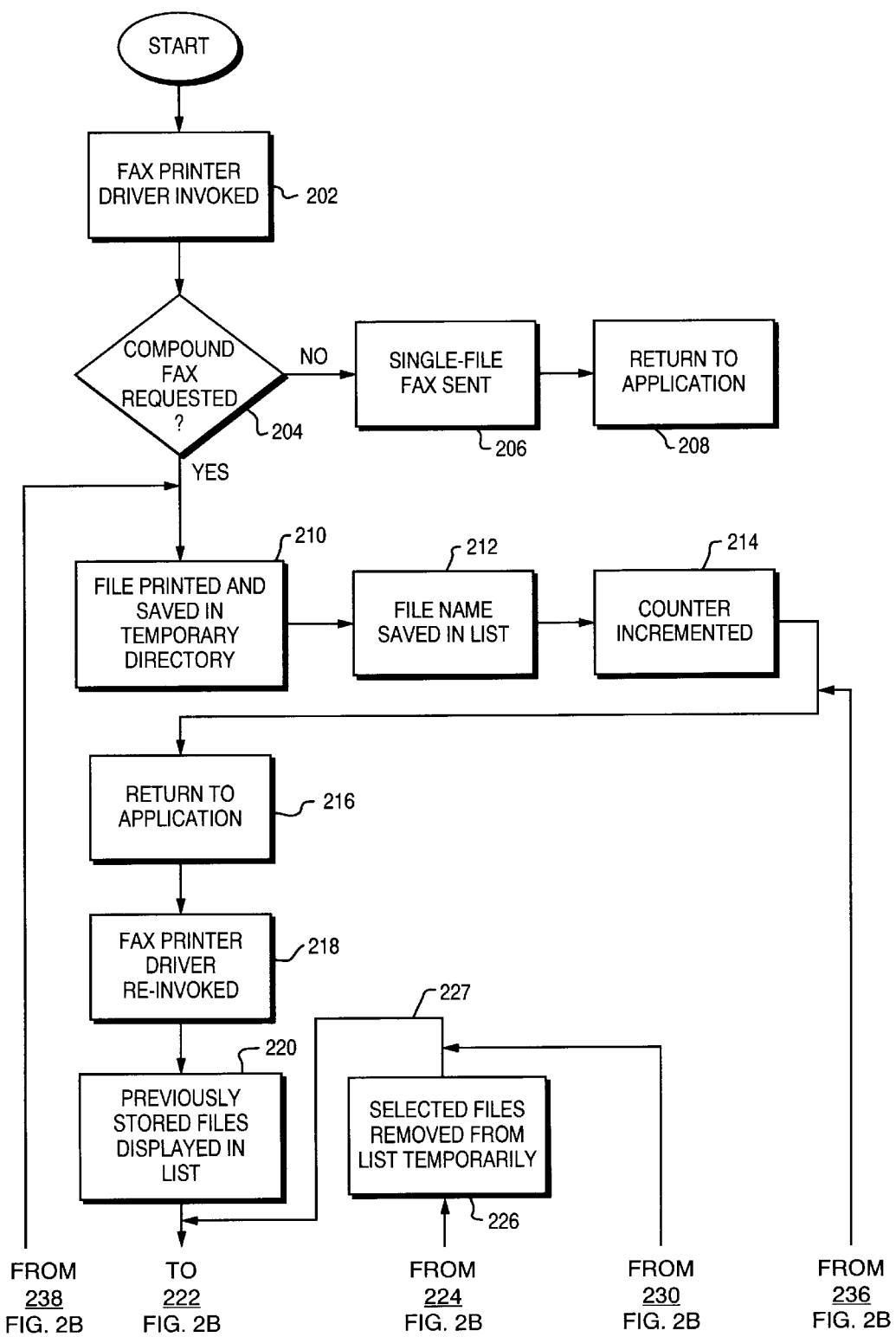
FIG. 2 is a flowchart of the creation of a multiple-file facsimile utilizing one embodiment of the system and method of the present invention.
Figure 2B:
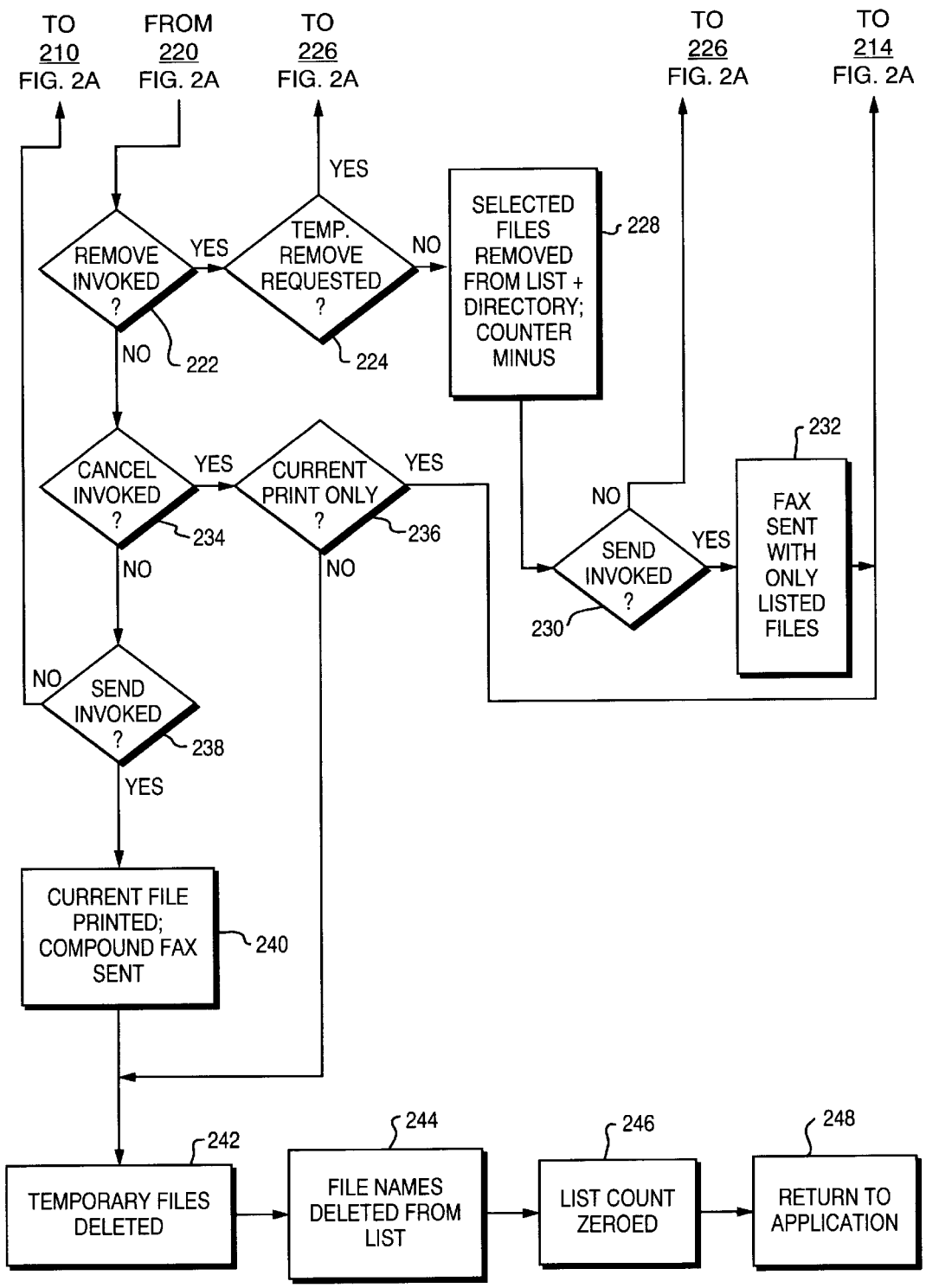

A flowchart representation of the creation of a single facsimile from multiple electronic files by a preferred embodiment of the invention is shown in FIG. 2. Within the application program, the user prepares the document for printing and then prints the document 202, choosing the fax printer as the target printer. A dialog box is presented to the user, showing the name of the temporary fax file that will be created by the print. At this time, the user chooses whether the document should be used to start a compound facsimile, by selecting the multiple-file facsimile feature 204, or whether it should be sent as a single-file fax in the regular manner 206, followed by returning the user to the application program 208.

When the user selects the multiple-file facsimile feature 204, the file is still converted to a faxable format 210, preferably an image file, as would normally be the case for transmission 206 of a single-file fax. However, the image file is then saved in a temporary multiple-file fax directory, rather than being faxed immediately as would be the case if the multiple-file fax feature had not been selected. The name of the saved file is remembered by the fax printer driver by storing the file name in a list in memory 212. This is done in a preferred embodiment by saving it in a list in the fax printer driver initialization (e.g. "*.ini") file. A count of the number of files earmarked for the multiple-file fax, preferably also kept in the fax printer driver initialization file, is then incremented by one 214.

The user is then returned to the application program from which the fax printer driver was originally accessed 216. Upon being returned to the original application program 216, the user may either open another file in that application or leave that application and open a file created in another application. Each file to be included in the multiple-file fax being composed is directed to the fax printer as the target printer.

The next time the fax printer driver is invoked 218, the initialization file or other memory storage locations are checked for the names of files which have been added to the multiple-file fax list. Any file name discovered there is automatically added to the list of files displayed to the user as being included in the multiple-file fax currently being built 220. In a preferred embodiment, this list is displayed in a subwindow within the SendFAX dialog box.

The user can choose to add the current file to the list only, and thus to the compound fax currently being composed, or may add the file to the fax and then send the fax. If the user only adds the file to the list, the file is converted to image format and saved 210 in the temporary directory as before, the file name is stored in the multiple-file fax list 212, the list count is incremented 214, and the user is again returned to the calling application program 216.

This procedure is repeated as many times as is necessary to compose the desired single facsimile comprised of multiple electronic files, but, unlike other multiple-file or compound facsimile products, only one step must be performed for each file to be included in the fax. Selecting the multiple-file fax feature causes the file to be included in the multiple-file fax automatically, without further explicit selection of the files to be included as is required by other products. By default, all of the files in the multiple-file fax list will be included as part of the next fax sent.

In a preferred embodiment, the user may interrupt the building of a multiple-file fax in order to send a different fax. This can be accomplished through the SendFAX dialog box, removing the automatically attached files from the multiple-file fax list and thus overriding the feature's default behavior of sending all listed files as part of the next fax sent. If desired, this function can be combined with a regular "remove file from list" function 222. The user selects particular files to be removed from the multiple-file fax list and then is queried 224 as to whether the selected files from the list should be removed from the compound fax that is being composed, or should just be temporarily removed for the purposes of the current fax transmission.

If the temporary removal option 226 is selected, the user may send the current file without the complete set of files included in the multiple-file fax that was being composed. The current multiple-file fax list will still be available the next time the fax printer driver is invoked. Only those files selected for temporary removal are removed from the fax that is subsequently sent if the send command is invoked; if not all files are selected for removal, the remaining ones are still included in the current fax. After removal of files, the user remains 227 in the SendFAX dialog box and may then choose to remove additional files, to cancel either printing of the current fax or composition of the multiple-file fax, to send the fax, or to add the current file to the list.

If the permanent removal option 228 is selected, the selected file names are deleted from the list of files comprising the multiple-file fax, the associated image files are deleted from the user's multiple-file fax temporary directory, and the multiple-file fax counter is decremented accordingly. If the send fax function is then invoked 230, the current file is printed and then sent in a fax containing only the remaining listed files 232, after which the user is returned to the application program 216. Otherwise, the user remains 227 in the SendFAX dialog box and may then choose to remove additional files, to cancel either printing of the current fax or composition of the multiple-file fax, send the fax, or to add the current file to the list.

All files can be easily removed from a compound fax by invoking the "cancel" function 234. In a preferred embodiment, the user is asked 236 if the print of the current file alone should be halted, or if the entire multiple-file fax currently being composed should be deleted. If the print of the current file is halted, the user is returned directly to the calling application program 216. If the entire compound fax is to be deleted, each file is removed from the user's multiple-file fax temporary directory 242, the name of each file is removed from the multiple-file fax list 244, the multiple-file fax list count is returned to zero 246, and the user is then returned to the application program 248.

After the multiple-file fax has been completely composed, the user tells the printer driver to send it 238. By default, all of the files in the multiple-file list are sent when the fax is sent 240. In the preferred embodiment discussed previously, the fax includes all the files in the list contained in the fax printer driver initialization file plus the current file after it has been converted, which occurs at this time 240.

After the multiple-file fax has been sent 240, all of the files in the multiple-file fax temporary directory are deleted 242, the file names are removed from the multiple-file fax list in memory 244, the multiple-file fax list count is returned to zero 246, and the user is returned to the application program 248. The user is never required to manually delete the files that have been sent or to remove them from the list. In this manner, the composition of each multiple-file fax is started on a clean slate, eliminating the need for the user to select among a large number of files irrelevant to the current fax in order to compose the new fax, and consequently significantly reducing the potential for user-created fax composition errors.

Figure 3:
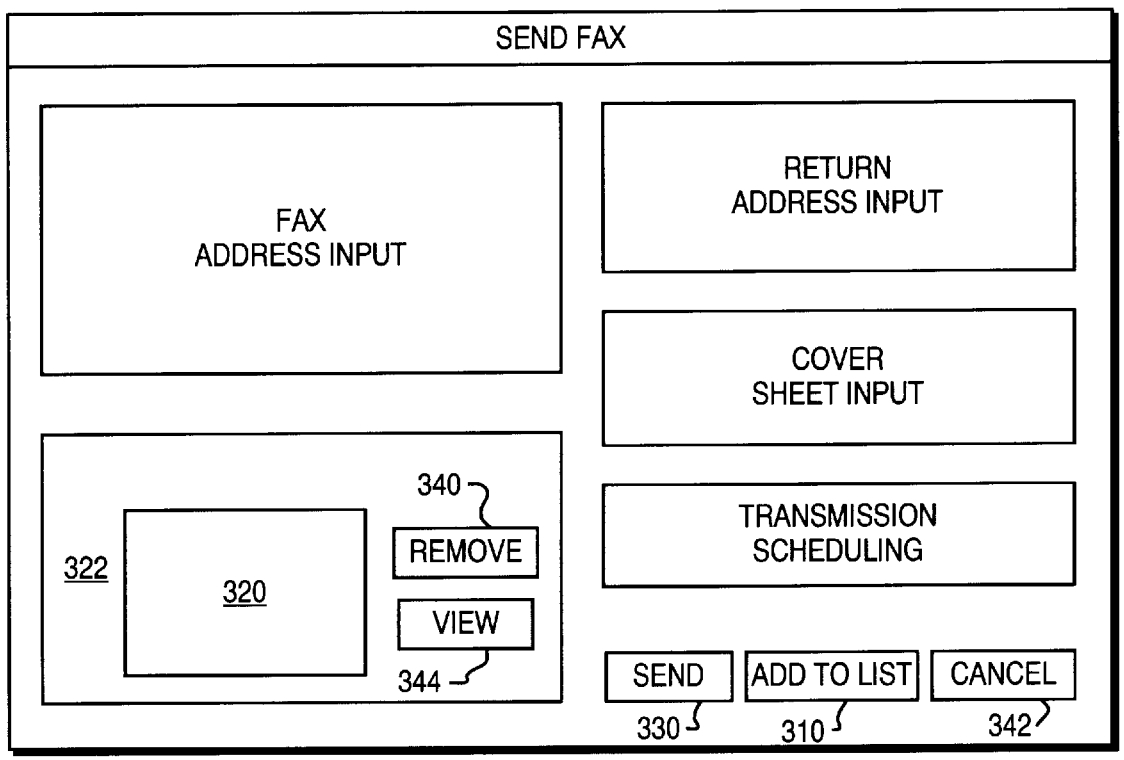
FIG. 3 is a representation of one embodiment of a dialog box through which a user may access an embodiment of the multiple-file facsimile feature of the present invention.

A preferred implementation of the SendFAX dialog box that is displayed by the fax printer driver when the user requests fax transmission of a file is shown in FIG. 3. In this preferred embodiment, a dedicated button for multiple-file fax creation 310, labeled "Add to List", is included in the dialog box. All the file names stored in the fax printer driver initialization file list are automatically displayed as a list 320 of files which will be included in the multiple-file fax that is currently being built, along with the name of the current file. In the preferred embodiment, this list 320 is displayed in an Attachment subwindow 322 within the SendFAX dialog box. When the last file is ready to be added to the multiple-file fax, the user utilizes the SendFAX dialog box to not only add that last file to the fax, but also to address the fax, create a cover sheet, and finally to send the multiple-file fax using the dedicated "Send" button 330.

As discussed previously, the user may interrupt the building of a multiple-file fax in order to send a different fax. This can be accomplished by using separate SendFAX dialog box control buttons to either "Remove" 340 one or more of the automatically attached files from the multiple-file fax list, thus essentially overriding the feature's default behavior of sending all listed files as part of the next fax sent, or to "Cancel" 342 either the current print operation or the composition of the entire multiple-file fax. Files to be removed using the button 340 are selected from the list 320. It is possible to view the files on the list by utilizing a dedicated "View" button 344 in the attachment subwindow 322.

The multiple-file fax feature of the present invention is implemented on a LAN-based server in the preferred embodiment. Such an implementation allows a single fax modem or apparatus to be accessed by several users. It also allows many of the fax transmission processing tasks to be performed away from the user's desktop environment, freeing up the user's desktop machine resources for other tasks. Other advantages to be obtained from a LAN-based implementation include centralized administration of fax transmission activities, including the possibility of centralized bill-back and accounting functions, and improved efficiency and utilization of fax and network resources, leading to a lower per user cost.

As previously indicated, in a preferred embodiment the present invention is advantageously implemented by means of a computer containing suitable programs and data structures for providing the desired control functions. The following C-language program listing illustrates, to those skilled in the art, an implementation of a preferred embodiment.

```
/******************************************************************
 *
 * f4wsf.c  -  send fax module
 *
 * Copyright (c) 1996 Biscom, Inc.
 *
 ******************************************************************/
#include <windows.h>
#ifdef VINES
#define INCL_MAIL
#define INCL_STDA_UI
#define INCL_UD
#define INCL_STDA
#define INCL_ST
#include "vnsapi.h"
#elif defined(VIM)
#include <vim.h>
#endif
#include <shellapi.h>
#include <commdlg.h>
#include <stdlib.h>
#include <time.h>
#include <string.h>
#include <ctype.h>
#include <dos.h>
#include <io.h>
#include <stdio.h>
#include <sys\types.h>
include <sys\stat.h> include "f4win.h"
include "f4wdlg.h"

// from other modules
extern struct CONFIG config;
extern HANDLE hInst;
extern HCURSOR hHourGlass;
extern HGLOBAL HglbAFirst, HglbALast, HglbSender;
#if !defined(DLL)
extern bWaitforTemp;
extern HWND hWndAll;
#endif
```

```
#if !defined(VINES) && !defined(VIM)
extern FAXACTION FaxAction;
extern HFILE hFolderSem;
#endif
#if defined(VIM)
extern BOOL bSend, bSave;
#endif
#if defined(DLL)
BOOL bAddtoList;
extern LPSTR lpAppString;
endif // share in this module
static char buf[MSDOS_PATH_SIZE], buf2[MSDOS_PATH_SIZE + 32];
static UINT i;

// share with other modules
char szPrintFile[MSDOS_PATH_SIZE];
char szPrinttoFile[MSDOS_PATH_SIZE];
char szEnvFile[MSDOS_PATH_SIZE];
HGLOBAL hglb, hglb1, HglbFirst, HglbLast, HglbCurrent, HglbAList;
UINT cFiles, cOldFiles, cNumbers, Index;

BOOL CheckFiles(HWND hDlg)
{
int stat;
UINT i, j;
HFILE hFile, hTrans;
OFSTRUCT of;
char tbuf[3];
static char buf[MSDOS_PATH_SIZE];
FARPROC lpfnReset_Bisfax_Trans, lpfnStart_from, lpfnCall_App_One;
static char szTransFile[MSDOS_PATH_SIZE];
HGLOBAL hglb;
ATTACH_FILE FAR *lpAttachFile;

// if ADD button enabled, remind user some file not added to send list
    if(GetDlgItemText(hDlg, IDD_FILE_NAME, tbuf, 2)) {
        LoadString(hInst, IDS_ADD_FILE, buf, sizeof(buf));
        stat = MessageBox(hDlg, buf, "Warning",
            MB_ICONQUESTION | MB_YESNOCANCEL);
        if(stat == IDYES)
```

```
                    AddNewFile(hDlg, FALSE);
                else if(stat == IDCANCEL)
                    return(FALSE);
            }

5      // if any files to send, check that they're available
            if(cFiles) {
        #if defined(DLL)
                for(j = 1; j < cFiles; j++) {
        #else
10              for(j = 0; j < cFiles; j++) {
        #endif
                    i = 0;
                    SendDlgItemMessage(hDlg, IDD_FILE_LIST, LB_GETTEXT,
        (WPARAM) j,
15                      (LPARAM)((LPCSTR)buf));
                    if(buf[0] == '*') {
                        cOldFiles++;
                        continue;
                    }
20                  if((hFile = OpenFile(buf, &of, OF_EXIST)) == HFILE_ERROR) {
        #if !defined(DLL)
                        if(bWaitforTemp && !lstrcmpi(szPrintFile, buf)) {
                            bWait = TRUE;
                            continue;
25                      }
        #endif
                        DisplayMessage2(hDlg, ERROR, IDS_ERR_BAD_ATTACH,
        (LPSTR)buf);
                        SendDlgItemMessage(hDlg, IDD_FILE_LIST,
30      LB_DELETESTRING,
                            (WPARAM)j, 0L);
                        cFiles--;
                        SetDlgItemText(hDlg, IDD_FILE_NAME, buf);
                        return(FALSE);
35                  }
                }

// if no files to send and no memo, report nothing to send
            } else if(!bMemo) {
                DisplayMessage2(hDlg, ERROR, IDS_NOTHING_TO_SEND);
40              SetFocus(GetDlgItem(hDlg, IDD_FILE_NAME));
```

-21-

```
                return(FALSE);
            }

// see if can use client translation
            bTrans = FALSE;
 5          if(config.bUseClientTrans) {
#if defined(VINES)
                wsprintf(buf, "%sbiscomt.dll", (LPSTR)config.szExePath);
#else
                wsprintf(buf, "%s%sbiscomt.dll", (LPSTR)config.szBisFax,
10                  (LPSTR)F4LAN_UTIL_DIR);
#endif
                if(OpenFile(buf, &of, OF_EXIST) != HFILE_ERROR) {
                    if((hTrans = LoadLibrary(buf)) >= HINSTANCE_ERROR) {
                        lpfnReset_Bisfax_Trans = GetProcAddress(hTrans,
15                          "Reset_Bisfax_Trans");
                        lpfnStart_from = GetProcAddress(hTrans, "Start_from");
                        lpfnCall_App_One = GetProcAddress(hTrans, "Call_App_One");
                        bTrans = TRUE;
                        (*lpfnReset_Bisfax_Trans)();
20                  }
                }
            } if defined(DLL)
            if(bTrans && cFiles > 1) {
25              if(!(*lpfnStart_from)((LPSTR)lpAppString)) {
                    FreeLibrary(hTrans);
                    return(FALSE);
                }
            }
30  #endif
            if(cFiles) {
#if defined(DLL)
                for(j = 1; j < cFiles; j++) {
#else
35              for(j = 0; j < cFiles; j++) {
#endif
                    SendDlgItemMessage(hDlg, IDD_FILE_LIST, LB_GETTEXT,
(WPARAM) j,
                        (LPARAM)((LPCSTR)buf));
40                  if(buf[0] == '*')
```

```
                        continue;
                 if(bTrans) {
                        if(!(*lpfnCall_App_One)((HWND)hDlg, (LPSTR)buf,
                                (LPSTR)szTransFile)) {
 5                         FreeLibrary(hTrans);
                           return(FALSE);
                        }
                 } else
                        lstrcpy(szTransFile, buf);
10               if((hglb = GlobalAlloc(GHND, sizeof(ATTACH_FILE))) == NULL) {
                        DisplayMessage2(hDlg, ERROR,
        IDS_ERR_GMEM_TEMP_ATT);
                        return(FALSE);
                 }
15               lpAttachFile = (ATTACH_FILE FAR *)GlobalLock(hglb);
                 lstrcpy(lpAttachFile->szFileName, szTransFile);

// init stuff
                 lpAttachFile->bPrintFile = FALSE;
                 lpAttachFile->bDeleteFile = lstrcmpi(buf, szTransFile) ? TRUE :
20                      FALSE;
                 if(!lpAttachFile->bDeleteFile)
                        lpAttachFile->bDeleteFile = (BOOL)SendDlgItemMessage(hDlg,
                                IDD_FILE_LIST, LB_GETITEMDATA, (WPARAM)j, 0L);
                 lpAttachFile->bFolderFile = FALSE;
25               GlobalUnlock(hglb);
                 if(HglbALast) {
                        lpAttachFile = (ATTACH_FILE FAR *)GlobalLock(HglbALast);
                        lpAttachFile->HglbNext = hglb;
                        GlobalUnlock(HglbALast);
30               } else
                        HglbAFirst = hglb;
                 HglbALast = hglb;
              }
        }

35      if(bTrans)
                FreeLibrary(hTrans);
        return(TRUE);
    }

BOOL IsFileOK(HWND hDlg, char *pFile) {
```

```
    int i, cItems;
    char buf2[MSDOS_PATH_SIZE];

// check if this file already in list
        cItems = (UINT)SendDlgItemMessage(hDlg, IDD_FILE_LIST,
    LB_GETCOUNT, 0,
            0L);
        for(i = 0; i < cItems; i++) {
            SendDlgItemMessage(hDlg, IDD_FILE_LIST, LB_GETTEXT,
    (WPARAM)i,
                (LPARAM)((LPCSTR)buf2));
            if(!lstrcmpi(pFile, buf2)) {
                LoadString(hInst, IDS_DUP_FILE, buf2, sizeof(buf2));
                if(MessageBox(hDlg, buf2, "Warning", MB_ICONQUESTION |
    MB_YESNO)
                    == IDNO) {
                    SetFocus(GetDlgItem(hDlg, IDD_FILE_NAME));
                    return(FALSE);
                } else
                    break;
            }
        }
        return(TRUE);
    } void SendFaxCleanUp(HWND hDlg)
    {
    HGLOBAL hglb, hglb1;
    WORD i, cFiles;
    OFSTRUCT of;
    ATTACH_FILE FAR *lpAttachFile;
    char buf[MSDOS_PATH_SIZE];

// free recipient memory, if needed
        hglb = HglbFirst;
        for(i = 0; i < cNumbers; i++) {
            lpRecipInfo = (struct RECIP_INFO FAR *)GlobalLock(hglb);
            hglb1 = lpRecipInfo->HglbNext;
            GlobalUnlock(hglb);
            GlobalFree(hglb);
            hglb = hglb1;
        }
```

−24−

```
             HglbFirst = NULL;
             cNumbers = 0;

// free memo memory, if needed
             if(bMemo)
 5                   LocalFree(hMemo);
             bMemo = NULL;

// free attachment memory and delete temp attaches
             hglb = HglbAFirst;
             while(hglb) {
10                   lpAttachFile = (ATTACH_FILE FAR *)GlobalLock(hglb);
                     hglb1 = lpAttachFile->HglbNext;
                     if(lpAttachFile->bDeleteFile)
                         OpenFile(lpAttachFile->szFileName, &of, OF_DELETE);
                     GlobalUnlock(hglb);
15                   GlobalFree(hglb);
                     hglb = hglb1;
             }
             HglbAFirst = HglbALast = NULL;
             cFiles = (WORD)SendDlgItemMessage(hDlg, IDD_FILE_LIST,
20       LB_GETCOUNT, 0,
                     0L);
             for(i = 0; i < cFiles; i++) {
                     if(SendDlgItemMessage(hDlg, IDD_FILE_LIST, LB_GETITEMDATA,
                         (WPARAM)i, 0L)) {
25                       SendDlgItemMessage(hDlg, IDD_FILE_LIST, LB_GETTEXT,
         (WPARAM)i,
                             ((LPARAM)(LPCSTR)buf));
                         OpenFile(buf, &of, OF_DELETE);
                     }
30           } if(bScanLaunched && !lstrcmpi(config.szScanner, VISIONEER)) {
                     WritePrivateProfileString(PS_MM_FAXCOM, PE_MM_LAUNCHED,
         "0",
                         szMMIniFile);
35                   WritePrivateProfileString(PS_MM_FAXCOM, PE_MM_TMP_FILE, "",
                         szMMIniFile);
             }
             bScanLaunched = FALSE;
             szPrintFile[0] = '\0';
```

-25-

```
        }
        BOOL IsCompoundFax(HWND hDlg)
        {
        WORD i, j, stat;
  5     ATTACH_FILE FAR *lpAttachFile;
        char szFile[MSDOS_PATH_SIZE];

if(HglbAList) {
               stat = (WORD)(GlobalSize(HglbAList)/sizeof(ATTACH_FILE));
               lpAttachFile = (ATTACH_FILE FAR *)GlobalLock(HglbAList);
 10            for(i = 0; i < cFiles; i++) {
                   SendDlgItemMessage(hDlg, IDD_FILE_LIST, LB_GETTEXT,
        (WPARAM)i,
                       (LPARAM)((LPCSTR)szFile));
                   for(j = 0; j < stat; j++) {
 15                    if(lstrcmpi((lpAttachFile + j)->szFileName, szFile) == 0) {
                           GlobalUnlock(HglbAList);
                           return(TRUE);
                       }
                   }
 20            }
               GlobalUnlock(HglbAList);
           }
           return(FALSE);
        }

25     BOOL FAR PASCAL SendFaxProc(HWND hDlg, unsigned message, WORD
        wParam,
            LONG lParam)
        {
        static BOOL bPM;
 30     static OPENFILENAME ofn;
        static time_t ltime;
        static char szMBDir[MSDOS_PATH_SIZE];
        #if defined(VIM)
        static struct tm FAR *newtime, SendTime;
 35     #else
        static struct tm *newtime, SendTime;
        #endif
        static char szFile[MSDOS_PATH_SIZE];
        static WORD cWaitLoops, cWaitPoll;
 40     #if !defined(DLL)
```

–26–

```
                WORD wWaitTime;
                #endif
                char szFilter[64], buf1[32];
                char *pFF, *pF, *pPath, *pFile;
    5           char chReplace;
                FARPROC lpProc;
                DWORD dwIndex;
                WORD i, stat;
                int iRet;
    10          #if defined(DLL)
                WORD j;
                #endif
                UINT cbRead;
                HLOCAL hlFF, hlF;
    15          OFSTRUCT of;
                HGLOBAL hglb, hglb1, hglbPrev;
                ATTACH_FILE FAR *lpAttachFile;
                #if defined(VINES)
                HCURSOR hSaveCursor;
    20          PSTR Recipients;
                HLOCAL hloc;
                #elif !defined(VIM)
                static char AccountByte;
                #endif
    25          HFILE hFile;
                static struct _stat fileinfo;

switch(message) {
                        case WM_INITDIALOG:
                // check that lan parms init
    30                      if(!CheckLanConfig()) {
                                SetFocus(hDlg);
                                EndDialog(hDlg, TRUE);
                                return(TRUE);
                            }

35          // load print file into file list (only if we're DLL)
                #if defined(DLL)
                #if !defined(VINES) && !defined(VIM)
                            hFolderSem = HFILE_ERROR;
                #endif      // !defined(VINES) && !defined(VIM)
    40                      SendDlgItemMessage(hDlg, IDD_FILE_LIST, LB_ADDSTRING, 0,
```

```
                        (LPARAM)((LPCSTR)szPrinttoFile));
            cFiles++;

// load attach list files into file list
            HglbAList = NULL;
            stat = GetPrivateProfileInt(PS_PRINT_DRV,
PE_ATTACH_LIST_COUNT,
                0, INI_FILE);
            if(stat) {
                if((HglbAList = GlobalAlloc(GHND, stat *
sizeof(ATTACH_FILE)))
                        == NULL) {
                    DisplayMessage2(hDlg, ERROR,
IDS_ERR_GMEM_TEMP_ATT);
                    EndDialog(hDlg, FALSE);
                    return(TRUE);
                }
                lpAttachFile = (ATTACH_FILE FAR *)GlobalLock(HglbAList);
                for(i = 0; i < stat; i++) {
                    wsprintf(buf, "%s%02d", (LPSTR)PE_ATTACH_FILE, i);
                    GetPrivateProfileString(PS_PRINT_DRV, buf, "",
                        (lpAttachFile + i)->szFileName,
                        sizeof(lpAttachFile->szFileName), INI_FILE);
                    SendDlgItemMessage(hDlg, IDD_FILE_LIST,
LB_ADDSTRING, 0,
                        (LPARAM)((LPCSTR)(lpAttachFile + i)->szFileName));
                    cFiles++;
                }
            }
#else
// add files to attach list from command line, DDE, or drag-and-drop
            if(HglbAFirst) {
                hglb = HglbAFirst;
                while(hglb) {
                    lpAttachFile = (ATTACH_FILE FAR *)GlobalLock(hglb);
                    SendDlgItemMessage(hDlg, IDD_FILE_LIST,
LB_ADDSTRING, 0,
                        (LPARAM)((LPCSTR)lpAttachFile->szFileName));
                    hglb1 = lpAttachFile->HglbNext;
                    if(hglb == HglbAFirst)
                        lstrcpy(szPrintFile, lpAttachFile->szFileName);
                    GlobalUnlock(hglb);
```

```
                        GlobalFree(hglb);
                        hglb = hglb1;
                        cFiles++;
                    }
 5              }
                HglbAFirst = HglbALast = NULL;

// disable print-to-file and add-to-list if not dll
                EnableWindow(GetDlgItem(hDlg, IDD_SF_PRINT_FILE), FALSE);
                ShowWindow(GetDlgItem(hDlg, IDD_ADD_TO_LIST), SW_HIDE);
10      #endif   // defined(DLL)

#endif
                case WM_COMMAND:
                    switch(wParam) {
                        case IDD_SEND:
15      #if defined(VIM)
                            if(bSavedMessage == TRUE) {
                                EndDialog(hDlg, TRUE);
                                return(TRUE);
                            }
20      #endif
        #if defined(DLL)
                            if(IsDlgButtonChecked(hDlg, IDD_SF_PRINT_FILE)) {
                                lpProc = MakeProcInstance(PrintFileProc, hInst);
                                if(!DialogBox(hInst,
25      MAKEINTRESOURCE(IDD_ADD_NOTE),
                                    hDlg, lpProc))
                                    return(TRUE);
                                FreeProcInstance(lpProc);
                                EndDialog(hDlg, TRUE);
30                              return(TRUE);
                            }
        // warn if attach list files are in fax
                            if(IsCompoundFax(hDlg)) {
                                stat = MessageBox(hDlg,
35      "This fax contains one or more attachments which were automatically added to the
        attachment list.  Do you wish to send this fax?",
                                        "Warning", MB_ICONQUESTION |
        MB_YESNO);
                                if(stat == IDNO)
40                                  return(TRUE);
```

```
                                }
                        #endif

// check if all recipients and files have been added
                                if(!CheckRecipients(hDlg))
 5                                      return(TRUE);
                                if(!CheckFiles(hDlg))
                                        return(TRUE);

if(!PreSendFax(hDlg))
                                        return(TRUE);
10                      #if (defined(VINES) || defined(VIM)) && defined(DLL)
                                EndDialog(hDlg, TRUE);
                                return(TRUE);
                        #endif // fall through to clean up
15                              case IDCANCEL:
                                        SendFaxCleanUp(hDlg);
                        #if defined(DLL)
                                        if(wParam == IDCANCEL) {
                                                if(IsCompoundFax(hDlg)) {
20                                                      stat = MessageBox(hDlg,
                        "This fax contains one or more attachments which were automatically added to the
                        attachment list. Do you wish to delete these files?",
                                                                "Warning", MB_ICONQUESTION | MB_YESNO);
                                                        if(stat == IDYES) {
25                                                              lpAttachFile =
                                                                        (ATTACH_FILE FAR *)GlobalLock(HglbAList);
                                                                for(j = 0; j < stat; j++)
                                                                        OpenFile((lpAttachFile + j)->szFileName,
                                                                                &of, OF_DELETE);
30                                                              WritePrivateProfileString(PS_PRINT_DRV,
                                                                        PE_ATTACH_LIST_COUNT, "0", INI_FILE);
                                                                GlobalUnlock(HglbAList);
                                                        }
                                                }
35                                              GlobalFree(HglbAList);
                                        }
                        #endif // go home
```

−30−

```
                    EndDialog(hDlg, wParam == IDD_SEND ? TRUE : FALSE);
                    return(TRUE);

#if defined(DLL)
            case IDD_ADD_TO_LIST:
    // save file name and exit
                    SendDlgItemMessage(hDlg, IDD_FILE_LIST, LB_GETTEXT,
                        (WPARAM)0, (LPARAM)(LPCSTR)szPrinttoFile);
                    SendFaxCleanUp(hDlg);
                    bAddtoList = TRUE;
                    EndDialog(hDlg, TRUE);
                    return(TRUE);
    #endif case IDD_SF_FILE_REM:
                if((dwIndex = SendDlgItemMessage(hDlg, IDD_FILE_LIST,
                        LB_GETCURSEL, 0, 0L)) == LB_ERR)
                    break;
                SendDlgItemMessage(hDlg, IDD_FILE_LIST, LB_GETTEXT,
                    (WPARAM)dwIndex, (LPARAM)(LPSTR)buf);

// file has ATTACH_FILE record, remove it from list
                if(buf[0] == '*') {
                    hglbPrev = NULL;
                    hglb = HglbAFirst;
                    for(i = 0; i < (WORD)dwIndex; i++) {
                        lpAttachFile =
                            (ATTACH_FILE FAR *)GlobalLock(hglb);
                        hglb1 = lpAttachFile->HglbNext;
                        GlobalUnlock(hglb);
                        hglbPrev = hglb;
                        hglb = hglb1;
                    }
                    lpAttachFile = (ATTACH_FILE FAR *)GlobalLock(hglb);
                    hglb1 = lpAttachFile->HglbNext;
                    GlobalUnlock(hglb);
                    GlobalFree(hglb);
                    if(HglbAFirst == hglb)
                        HglbAFirst = hglb1;
                    else {
                        lpAttachFile =
                            (ATTACH_FILE FAR *)GlobalLock(hglbPrev);
```

```
                                 lpAttachFile->HglbNext = hglb1;
                                 GlobalUnlock(hglbPrev);
                         }
                         if(HglbALast == hglb)
  5                          HglbALast = hglbPrev;

} else {
                         if(stat = GetPrivateProfileInt(PS_PRINT_DRV,
                                 PE_ATTACH_LIST_COUNT, 0, INI_FILE)) {
                             for(i = 0; i < stat; i++) {
 10                              wsprintf(buf1, "%s%02d",
                                     (LPSTR)PE_ATTACH_FILE, i);
                                 GetPrivateProfileString(PS_PRINT_DRV, buf1,
                                     "", szFile, sizeof(szFile), INI_FILE);
                                 if(lstrcmpi(buf, szFile) == 0) {
 15                                  iRet = MessageBox(hDlg,
         "Selected file is from saved attachment list. Do you want to delete it from this
         list?",
                                         buf, MB_ICONQUESTION | MB_YESNO);
                                     if(iRet == IDYES) {
 20                                      for(; i < stat - 1; i++) {
                                             wsprintf(buf1, "%s%02d",
                                                 (LPSTR)PE_ATTACH_FILE, i + 1);

GetPrivateProfileString(PS_PRINT_DRV,
 25                                              buf1, "", szMBDir,
                                                 sizeof(szMBDir), INI_FILE);
                                             wsprintf(buf1, "%s%02d",
                                                 (LPSTR)PE_ATTACH_FILE, i);

30      WritePrivateProfileString(PS_PRINT_DRV,
                                                 buf1, szMBDir, INI_FILE);
                                         }
                                         wsprintf(buf1, "%d", --stat);
                                         WritePrivateProfileString(PS_PRINT_DRV,
 35                                          PE_ATTACH_LIST_COUNT, buf1,
                                             INI_FILE);
                                         OpenFile(szFile, &of, OF_DELETE);
                                     }
                                     break;
 40                              }
                             }
```

```
                    }
                }
                SendDlgItemMessage(hDlg, IDD_FILE_LIST, LB_DELETESTRING,
                        (WPARAM) dwIndex, 0L);
                --cFiles;
                EnableWindow(GetDlgItem(hDlg, IDD_SF_FILE_REM), FALSE);
                EnableWindow(GetDlgItem(hDlg, IDD_SF_FILE_VIEW), FALSE);
                break;

}
WORD wEndDoc( LPPDEVICE lpDestDev )
{
            if(bAddtoList) {
                bDeleteTemp = FALSE;
                bSend = FALSE;
            }

// find attachment file name
            if(bAppEnvFile)
                    wsprintf(szTiffPath, "%s%s%s",
                        (LPSTR) config.szBisSnd,
                        (LPSTR) F4LAN_SEND_PATH,
                        (LPSTR) F4LAN_OLD_ATT_DIR);
            else
                    wsprintf(szTiffPath, "%s%s%s\\%s",
                        (LPSTR) config.szBisPub,
                        (LPSTR) F4LAN_MB_PATH,
                        (LPSTR) config.szClientAddr,
                        (LPSTR) F4LAN_ATT_DIR);
            wsprintf(szUniqueFileName, "%lX", lseed + cAttachNum);
            strcat(szTiffPath, szUniqueFileName);
            if(!CopyFiles(szTiffPath, lpEnv->TiffPage[0].szPage)) {
                wError = ERR_COPY_ATTACH;
                break;
            }

// find action file name
            wsprintf(szTiffPath, "%s%s%s",
```

-33-

```
                            (LPSTR)config.szBisSnd,
                            (LPSTR)F4LAN_SEND_PATH,
                            (LPSTR)F4LAN_ACTION_DIR);
                        wsprintf(szUniqueFileName, "%lX", lseed);
 5                      strcat(szTiffPath, szUniqueFileName);
                        if(!CopyFiles(szTiffPath, lpEnv->TiffPage[0].szEnvFile)) {
                            wError = ERR_COPY_ACTION;
                            break;
                        }
10      #endif
                    } else if(!bSend && !bDeleteTemp && bAddtoList) {
                        stat = GetPrivateProfileInt(PS_PRINT_DRV,
                            PE_ATTACH_LIST_COUNT, 0, INI_FILE);
                        wsprintf(buf, "%s%02d", (LPSTR)PE_ATTACH_FILE, stat);
15                      WritePrivateProfileString(PS_PRINT_DRV, buf,
                            szPrinttoFile, INI_FILE);
                        stat++;
                        wsprintf(buf, "%d", stat);
                        WritePrivateProfileString(PS_PRINT_DRV,
20                          PE_ATTACH_LIST_COUNT, buf, INI_FILE);
                    }
                    switch(wError) {
                        case NO_ERROR:
        // if sent fax, delete any attach list files
25                          if(!bAddtoList && HglbAList) {
                                stat =
                                    (WORD)(GlobalSize(HglbAList) /
        sizeof(ATTACH_FILE));
                                lpAttachFile = (ATTACH_FILE FAR *)GlobalLock(HglbAList);
30                              for(i = 0; i < stat; i++)
                                    OpenFile((lpAttachFile + i)->szFileName, &of,
                                        OF_DELETE);
                                GlobalUnlock(HglbAList);
                                WritePrivateProfileString(PS_PRINT_DRV,
35                                  PE_ATTACH_LIST_COUNT, "0", INI_FILE);
                            }
                            wReturn = 1;
                            break;
                    }
40      WORD wStartDoc( LPPDEVICE lpDestDev, LPSTR lpInData )
        {
        // init some vars
```

```
            bAddtoList = FALSE;
            GetPrivateProfileString(PS_PRINT_DRV, PE_DEL_TEMP, "",
               buf, sizeof(buf), INI_FILE);
            if(buf[0] == 'n' || buf[0] == 'N')
               bDeleteTemp = FALSE;
            else
               bDeleteTemp = TRUE;

#if !defined(VINES) && !defined(VIM)
            cAttachNum = 1;
#endif
         }
```

As can be seen by those skilled in the art, the above program implements a preferred embodiment of a feature for a fax printer driver that allows a user to send multiple files in a single facsimile transmission directly from an application program. Briefly, the Add-to-List function is implemented in this embodiment in the several sections of program code following the comments "// load print file into file list", "// load attach list files into file list", "// save file name and exit", and "// find attachment file name", and in particular through the function "IsCompoundFax( )".

The Send multiple files function, with the clean-up function, is implemented in this embodiment in the several sections of program code following the comments "// warn if attach list files are in fax", "// find attachment file name", and "// if sent fax, delete any attach list files". The Cancel function is also implemented in the clean-up section of program code, following the comments "// fall through to clean up" and "// go home". The Remove function is implemented in this embodiment in the section of program code following the comment "// file has ATTACH_FILE record, remove it from list".

It is understood that the specific mechanisms and techniques described are merely illustrative of one application of the principles of the invention. Modifications and substitutions by one of ordinary skill in the art to the methods and apparatus described are considered to be within the spirit and scope of the present invention, which is not to be limited except by the claims which follow.

What is claimed is:

1. An apparatus for creating a single facsimile transmission from multiple named electronic files while utilizing one or more application programs on a computer, comprising, in combination:

input means for acceptance of instructions;

means for adding said names of said electronic files to a multiple-file facsimile file list and preparing said files for facsimile transmission, while utilizing one of said computer application programs, comprising, in combination:

means for converting a current one of said electronic files to a faxable format;

means for saving said converted current file to a temporary directory in the memory of said computer;

means for storing said name of said current electronic file in a section of memory in said computer allocated for said multiple-file facsimile file list; and means for adding additional current ones of said electronic files to said multiple-file facsimile transmission list until the last one of said files desired to be combined has been added to said list;

means for transmitting said multiple-file facsimile while still utilizing said computer application program from which said last file to be combined was added to said list, comprising, in combination:

means for combining all of said files saved in said temporary directory and listed in said multiple-file facsimile list into a single logical unit for facsimile transmission; and means for transmitting said single multiple-file facsimile comprised of said combined temporary files;

means for cleaning up after performing said facsimile transmission comprising means for removing the names of all of said files transmitted in said multiple-file facsimile from said multiple-file facsimile file list; and means for returning to said computer application program after any of said files is added to said multiple-file facsimile file list or said facsimile transmission has been completed.

2. The apparatus of claim 1, wherein said faxable format is an image file.

3. The apparatus of claim 1, wherein said single logical unit for facsimile transmission is an envelope file.

4. The apparatus of claim 1, wherein said computer is attached to a local area network through which the means of said facsimile transmission is accessed.

5. The apparatus of claim 1, wherein said means for cleaning up further includes means for deleting all of said files that were transmitted in said multiple-file facsimile from said temporary directory.

6. The apparatus of claim 5, further including counter means, said counter means being incremented by one for each of said files added to said multiple-file facsimile file list and being returned to zero by said cleaning up means.

7. The apparatus of claim 6, further including cancellation means, said cancellation means comprising, in combination:

means for halting said conversion and saving of said current file; and means for immediately returning to said application program.

8. The apparatus of claim 7, wherein said cancellation means further includes means for immediately activating said means for cleaning up even though said multiple-file facsimile has not yet been transmitted.

9. The apparatus of claim 6, further including remove means, comprising, means for temporarily removing selected ones of said files from said multiple-file facsimile file list until after said return to said computer application program.

10. The apparatus of claim 9, wherein said remove means further includes means for permanently removing selected ones of said files from said multiple-file facsimile file list, comprising, in combination:

means for removing the names of said selected ones of said files from said multiple-file facsimile file list;

means for deleting said selected ones of said files from said temporary directory; and means for decrementing said counter by the number of said permanently removed files.

11. The apparatus of claim 9, further including means for viewing any of said files listed on said multiple-file facsimile list.

12. A method for creating a single compound facsimile transmission from a plurality of named electronic files while utilizing one or more application programs on a computer, comprising, in combination, the steps of:

adding said names of said electronic files to a compound facsimile file list and preparing said files for facsimile transmission, while utilizing one of said computer application programs, by performing, in combination, the steps of:

converting a current one of said electronic files to a faxable format;

saving said converted current file to a temporary directory in the memory of said computer;

storing said name of said current electronic file in a section of memory in said computer allocated for said compound facsimile file list; and repeating the preceding steps with additional current ones of said electronic files until the last one of said files to be combined into said compound facsimile transmission has been added to said list;

while still utilizing said computer application program from which said last file to be combined was added to said list, transmitting said compound facsimile by performing the steps, in combination of:

combining all of said plurality of said files saved in said temporary directory and listed in said compound facsimile list into a single logical unit for facsimile transmission; and transmitting said single compound facsimile comprised of said plurality of temporary files;

cleaning up after performing said facsimile transmission, comprising the step of removing the names of all of said files that were transmitted in said compound facsimile from said compound facsimile file list; and returning to said computer application program.

13. The method of claim 12, wherein said faxable format is an image file.

14. The method of claim 12, wherein said single logical unit for facsimile transmission is an envelope file.

15. The method of claim 12, wherein said cleaning up step further includes the step of deleting all of said files from said temporary directory that were transmitted in said compound facsimile.

16. The method of claim 15, further including the steps of incrementing a counter by one for each of said files added to said compound facsimile file list and returning said counter to zero during said cleaning up step.

17. The method of claim 16, further including the step of providing an optional cancel function comprising the step of halting said conversion and saving of said current file, followed immediately by returning to said application program.

18. The method of claim 17, wherein said cancellation function further includes the steps, in combination, of:

removing the names of all of said files that were previously added to said compound facsimile from said compound facsimile file list;

deleting all of said previously added files from said temporary directory; and resetting said counter to zero.

19. The method of claim 16, further including the step of providing an optional remove function comprising the step of temporarily removing selected ones of said files from said compound facsimile file list until said return to said computer application program.

20. The method of claim 19, wherein said remove function further includes the optional step of permanently removing selected ones of said files from said compound facsimile, comprising the steps, in combination, of:

removing the names of said selected ones of said files from said compound facsimile file list;

deleting said selected ones of said files from said temporary directory; and decrementing said counter by the number of said permanently removed files.

21. The method of claim 20, further including the step of providing a means for viewing any of said files listed on said compound facsimile file list.

22. The method of claim 12, wherein said computer is attached to a local area network through which the means of said facsimile transmission is accessed.

23. The method of claim 12, wherein said computer application program invokes a fax printer driver to perform said steps of adding said names of said electronic files to said compound facsimile file list, preparing said files for facsimile transmission, and transmitting said compound facsimile.

24. The method of claim 23, wherein the specific steps performed by said fax printer driver may be user-controlled through a dialog box.

* * * * *